(12) United States Patent
Dheur et al.

(10) Patent No.: US 8,211,343 B2
(45) Date of Patent: Jul. 3, 2012

(54) METHOD AND ASSEMBLY FOR EXTRUDING A RUBBER COMPOUND

(75) Inventors: Jean Luc Dheur, Arlon (BE); Erich Nicolaus Lemaire, Marnach (LU); Michel Meunier, Gouvy (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/170,770

(22) Filed: Jun. 28, 2011

(65) Prior Publication Data

US 2011/0254194 A1  Oct. 20, 2011

Related U.S. Application Data

(62) Division of application No. 12/465,745, filed on May 14, 2009, now Pat. No. 8,002,535.

(51) Int. Cl.
*B29C 47/12* (2006.01)
(52) U.S. Cl. .................. 264/177.16; 425/382.4
(58) Field of Classification Search ............. 264/177.16; 425/382.4
See application file for complete search history.

(56) References Cited

U.S. PATENT DOCUMENTS

| | | | |
|---|---|---|---|
| 1,585,149 A | 5/1926 | Humphrey | |
| 3,759,653 A | 9/1973 | Schreiber | |
| 4,056,591 A | 11/1977 | Goettler et al. | |
| 4,439,125 A | 3/1984 | Dieckmann et al. | |
| 4,619,802 A | 10/1986 | Cloeren | |
| 4,826,422 A | 5/1989 | Hunter | |
| 5,522,719 A | 6/1996 | Umeda et al. | |
| 6,491,510 B1 | 12/2002 | Tieu et al. | |
| 6,495,081 B2 * | 12/2002 | Benatti | 264/177.16 |
| 7,661,949 B2 | 2/2010 | Kuijpers et al. | |
| 2004/0185132 A1 | 9/2004 | Looman, Jr. et al. | |

FOREIGN PATENT DOCUMENTS

| | | |
|---|---|---|
| EP | 0468306 | 1/1992 |
| EP | 1186397 | 3/2002 |
| GB | 661556 | 11/1951 |
| GB | 999548 | 7/1965 |
| JP | 2000301589 | 10/2000 |

OTHER PUBLICATIONS

Hurez, P, et al:"A new design procedure for profile extrusion dies", Polymer Engineering and Science, Brokfield Center, US Lnkd, DOI 10.10450, vol. 36, No. 5, Mar. 15, 1996, pp. 626-635, XP000594967, ISSN 0032-3888 Die Balancing; p. 630 Experimental validation; p. 632-634.

* cited by examiner

*Primary Examiner* — Yogendra Gupta
*Assistant Examiner* — Joseph Leyson
(74) *Attorney, Agent, or Firm* — David L King

(57) ABSTRACT

The invention relates to the extrusion of tire components with a large change of gauge across their cross-sectional area. It is provided a method and an assembly for extruding such a tire component with an extruder feeding a flow channel with a downstream die opening, whereby a deflector is provided in the flow channel upstream the die opening such that a flow of rubber is slowed down in front of broad portions of the cross-sectional area of the downstream die, avoiding distortion or bending of the extruded tire component.

2 Claims, 8 Drawing Sheets

METHOD AND ASSEMBLY FOR EXTRUDING A RUBBER COMPOUND

RELATED APPLICATIONS

This is a division of U.S. patent application Ser. No. 12/465,745 entitled "A Method And Assembly For Extruding A Rubber Compound" filed on May 14, 2009; now granted U.S. Pat. No. 8,002,535 issued Aug. 23, 2011.

FIELD OF THE INVENTION

The invention is directed to an assembly and a method and for extruding a rubber compound, and more specifically to an assembly and a method for uniformly extruding a tire component. The method and the assembly in accordance with the invention is particularly useful when the extrusion involves a substantial change of dimension along the cross-sectional area of the material of component being extruded, for example for a change of dimension along the cross-sectional area in a range of from 1 to 2, preferably 1 to 5 or more preferably at least 1 to 10. Such cross-sectional shapes are generally elongate and with a height or gauge varying in a substantially manner along the elongate cross-sectional shape. Accordingly, in a preferred aspect of the invention, the invention is directed to an assembly and a method and for extruding a rubber compound with a change of dimension along its cross-sectional area, and more specifically to an assembly and a method for uniformly extruding a tire component with a change of dimension along its cross-sectional area.

BACKGROUND OF THE INVENTION

It is known in the prior art of extruding tire components that it is difficult to extrude tire components featuring a large change in gauge along their cross-sectional area. The difficulty is further increased when the component does not exhibit any plane of symmetry. Such tire components are for instance apexes or wedges. The underlying problem is that the stream of rubber compound exhibits a higher velocity for the rubber compound flowing through the large portion of the cross-sectional opening of a die than through the smaller portion of the cross-sectional opening of the die. Thus, the extruded tire component may be twisted or bent after extrusion. For example, this occurs in case of extruding an apex. This component features a thick edge and a thin edge; hence, material being extruded chooses the path of least flow resistance and therefore converges where the opening of the die is large. This results in an excessive amount of material around the thick edge, a poor feeding around the thin edge and a big difference in the velocity field in the vicinity of the die. Thus, the extrudate exhibits large distortions and the tendency to bend as shown in FIG. 1 which represents schematically the flow of rubber through a prior art extrusion assembly 6 with the bent and distorted apex component 5 being extruded through the space delimited by the die contour 4.

Some proposals to enhance the extrusion of tire components featuring a large change in gauge across their cross-sectional area can be found in the prior art:

GB-A-661,556 mentions the possibility of providing escape openings aside small portions of the cross-sectional area of the die opening which help to obtain a more uniform velocity field of rubber compound flow through the whole cross-sectional area of the die opening. Unfortunately, excessive amounts of rubber compound material are produced which have to be recycled expensively later.

Another possibility which may enhance the uniformity of rubber compound flow is the utilization of a pre-former. A pre-former is positioned in the flow path of rubber compound directly upstream from the die opening, such that the flow velocity of the rubber compound is influenced appropriately to enhance the uniform extrusion of the tire component.

For example a die (downstream view on left hand side) and pre-former (upstream view on right hand side) assembly for the so-called Nakata extruder is shown in FIG. 2. As it can be seen this pre-former 11 is shaped to improve the flow towards the die opening 14. The thickness of the die contour is customized to be thin where the die opening 14 is thin, and is thick where the die opening is thick. In other words, this pre-former 11 renders the flow of the rubber compound easier in portions of the die opening being narrow. The disadvantage of such a solution is the geometrical complexity of the assembly, as each combination of die and pre-former must be customized.

In particular, for the extrusion of a thick wedge often pre-formers as shown in FIG. 3 are used. FIG. 3 illustrates the flow a rubber compound through a prior art extrusion assembly comprising the space delimited by a pre-former 21 and a die contour 24. This pre-former 21, which is placed in the flow upstream from the die opening 24 and downstream from the feeding channel 26, mainly features a cross-section which has an inverted shape with respect to the die opening's shape 24. Therefore indeed rubber compound is pushed laterally towards the edges of the die, and the velocity field is more uniform at all portions of the die opening's cross section. Nevertheless the pre-former 21 constitutes a severe flow restrictor, therefore it is sometimes even called a "brake". The disadvantage of such a solution is the large amount of viscous heating being produced causing a disadvantageous temperature increase of the extrudate. Overall the pressure drop increases and the total velocity of the rubber compound is significantly disturbed leading to a considerably reduced throughput.

GB-A-661,556 teaches also the use of an ogive shaped deflector to influence the velocity of rubber flow through a channel in front of a die opening for extruding a tire tread. The surface of this deflector has a tapering shape disposed with its smaller end remote from the die and therefore facing the flow of the material to be extruded. The obvious disadvantage of such a deflector is that it is not suitable for many shapes of die openings such that it is not possible to adjust the flow velocity of the rubber compound when extruding for example a wedge or an apex.

SUMMARY OF THE INVENTION

There is provided an assembly for extruding a rubber compound, the assembly comprising a die, the die comprising a die opening with a cross-section comprising a first area with a dimension which is larger than in a remaining area of the cross-section; a flow channel comprising the die, wherein the flow channel is configured for being connected to an extruder; and a deflector shaped as a positive obstacle and positioned in a flow channel upstream the die and in front of the first area of the cross-section of the die opening, the dimension of the deflector along its cross-section being smaller than the corresponding dimension of the first area of the cross-section of the die opening such that a flow of rubber compound is slowed down in front of the first area of the cross-section of the die.

In one aspect of the invention, there is provided an assembly for extruding a tire component with a change of dimension along its cross-sectional area, the assembly comprising a die with a cross-section comprising a first area with a dimension which is larger (higher) than in a remaining area of the cross-section, a flow channel connecting the die to an extruder, and a deflector shaped as a positive obstacle to be positioned in the flow channel upstream the die and in front of the first area of the cross-section of the die, the dimension of the deflector along its cross-section being smaller than the corresponding dimension of the first area of the cross-section of the die such that a flow of rubber compound is slowed down in front of the first area of the cross-section of the die.

A positive obstacle is to be understood as an obstacle which is solid and/or without any major opening, so that it can be avoided only by being circumvented. This is in opposition to the flow restrictors of the prior art with restricted openings which concentrate the flow of rubber.

In one aspect of the invention, an area of the cross-section of the die with a minimum dimension is free of deflector upstream in the flow channel.

In a yet further aspect of the invention, the cross-sectional shape of the deflector is similar at a reduced size to the shape of the first area of the die or mimics at a reduced size the shape of the first area of the die opening.

In a yet further aspect of the invention, the first area extends across the cross-section of the die from a first location with a maximum dimension to a second location which is distant from a location with a minimum dimension.

In a yet further aspect of the invention, the area with a minimum dimension is free of obstacle upstream in the flow channel.

In a yet further aspect of the invention, the deflector can be inserted or removed at the upstream side of the die.

In a yet further aspect of the invention, the deflector comprises at least one connector for attaching the deflector in the flow channel.

In a yet further aspect of the invention, the at least one connector is shorter than the deflector with respect to the flow direction of the rubber compound.

In a yet further aspect of the invention, the cross section of the die has an elongated shape, preferably a wedge or apex shape.

There is also provided a method for extruding a rubber compound, the method comprising the steps of providing an extruder, a die with a die opening the cross-section of which comprises a first area with a dimension which is higher than in a remaining area of the cross-section, and a flow channel connecting the extruder with the die; generating a flow of rubber compound with the extruder and extruding therewith the rubber compound through the flow channel and the die opening; and providing a deflector shaped as a positive obstacle in the flow channel upstream the die opening, wherein the deflector is positioned in front of the first area of the cross-section of the die opening and wherein the dimension of the cross-section of the deflector is smaller than a corresponding dimension of the first area of the cross-section of the die opening so that the flow of rubber compound is slowed down in front of the first area of the cross-section of the die.

In one further aspect of the invention, there is provided a method for extruding a tire component with a change of dimension along its cross-sectional area, the method comprising the steps of: providing an extruder, a die the cross-section of which comprising a first area with a dimension which is larger (higher) than in a remaining area of the cross-section, and a flow channel connecting the extruder with the die; generating a stream of rubber compound with the extruder and extruding therewith the tire component through the flow channel and the die opening; the method further providing a deflector shaped as a positive obstacle in the flow channel upstream the die opening, wherein the deflector is positioned in front of the first area of the cross-section of the die and the dimension of the cross-section of the deflector is smaller than the corresponding dimension of the first area of the cross-section of the die which is higher than in a remaining area of the cross-section such that the flow of rubber is slowed down in front of the first area of the cross-section of the die.

In a yet further aspect of the invention, one dimension, preferably the thickness, of the deflector is essentially constant along its cross-section.

In a yet further aspect of the invention, the cross-sectional shape of the die is an elongate wedge and the cross-sectional shape of the deflector is rectangular.

BRIEF DESCRIPTION OF THE DRAWINGS

The invention will be described by way of example and with reference to the accompanying drawings in which.

DETAILED DESCRIPTION OF THE INVENTION

Figure 1:
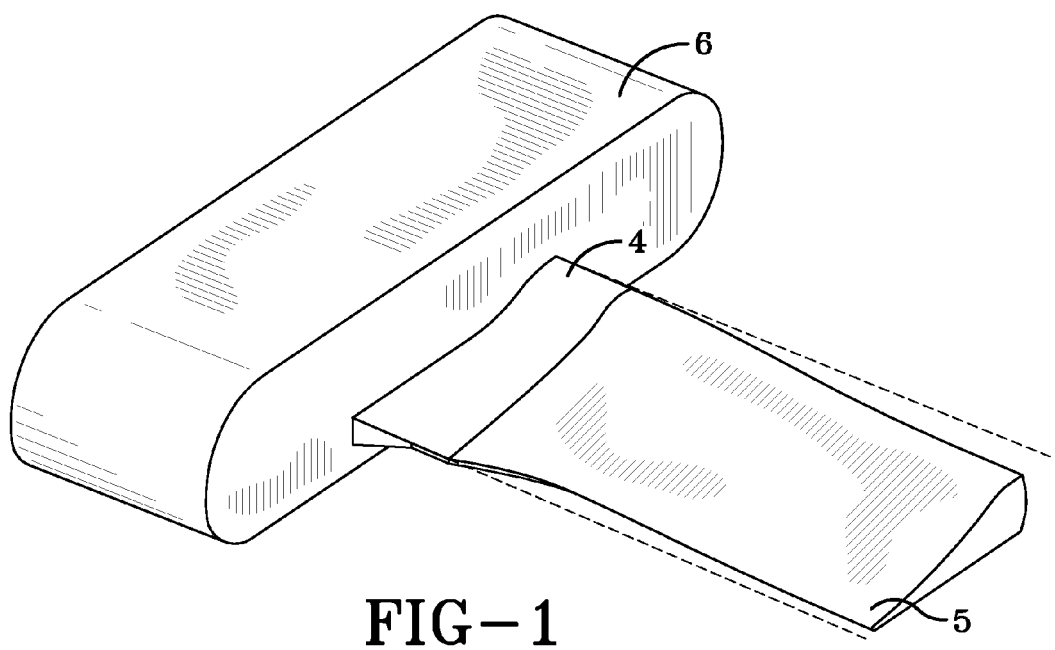
FIG. 1 (prior art) is a perspective view of the flow of rubber through an extrusion assembly comprising a flow channel and a die contour leading to a bended and twisted apex shaped tire component.
Figure 2:
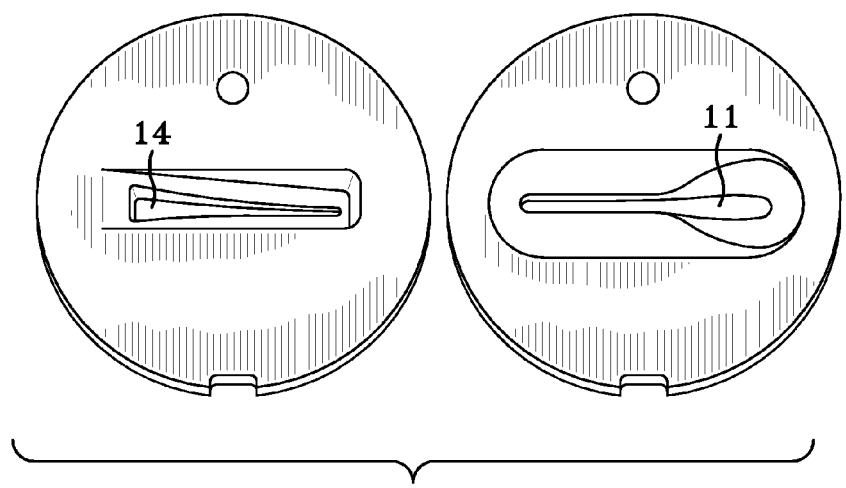
FIG. 2 (prior art) is a perspective view of a prior art pre-former and the corresponding die opening.
Figure 3:
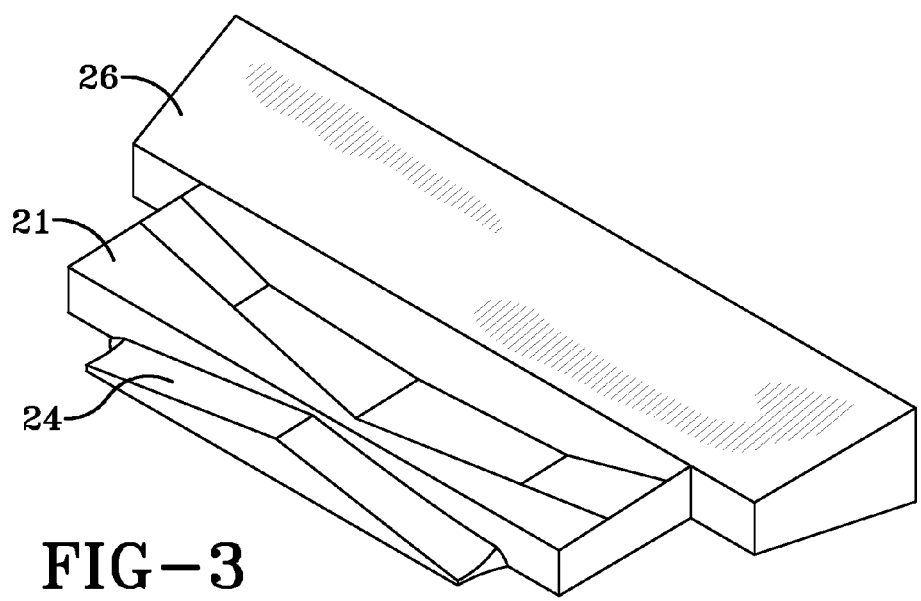
FIG. 3 (prior art) is a perspective view of the flow of rubber through an extrusion assembly comprising a flow channel, a prior art pre-former with a severe flow restriction and a die contour leading to an extruded thick wedge component.

The following language is to explain the best presently contemplated mode or modes of carrying out the invention.

This description is made for the purpose of illustrating the general principles of the invention and should not be taken in a limiting sense. The scope of the invention is best determined by reference to the appended claims. The reference numerals as depicted in the drawings are the same as those referred to in the specification.

Figure 4:
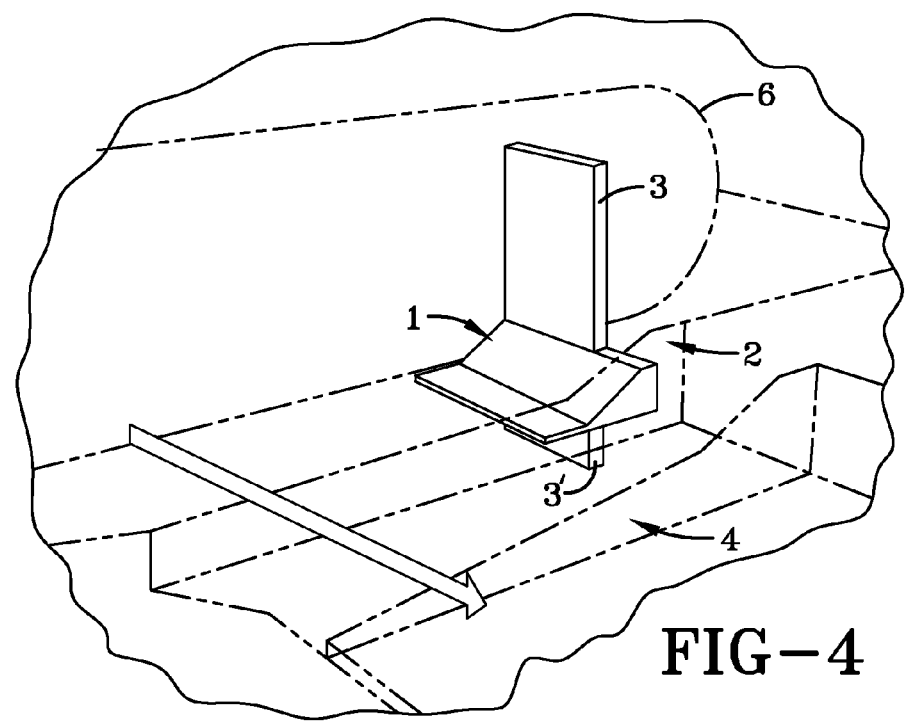
FIG. 4 is a perspective exploded view of an assembly for the extrusion of a tire component according to the invention, showing a deflector inside the flow channel upstream the die opening.

The present invention as shown in FIG. 4 features an extrusion assembly 6 with a deflector 1 in the flow channel 2 upstream a die opening 4. The flow direction of the rubber compound during extrusion is indicated by the arrow. Rubber compound is fed by an extruder (not shown) into the flow channel 2. The rubber compound then moves downstream the channel 2 passing the deflector 1 for being extruded through the die opening 4 in order to form the extruded tire component. The purpose of the deflector 1 is to slow down the incoming flow of rubber compound in front of large cross sectional portions of the cross sectional area of the die 4. Therefore deflector 1 is provided in the flow channel 2 as a positive obstacle in the flow of rubber compound. The deflector 1 is held by connectors 3, 3'. The deflector 1 has a similar cross-sectional shape as the large cross-sectional portion of the die opening 4 downstream of the deflector 1. The connectors 3, 3' are connecting the deflector 1 to the upper and lower walls of the flow channel 2. It is also possible to provide only one connector, e.g. depending on the specific die opening shape or utilized rubber compound. Furthermore, the connectors 3, 3' are shorter than the deflector 1 with respect to the flow direction of the rubber compound, resulting in less interference of the connectors 3, 3' with the flow of rubber compound. Additionally the cross section of the connectors 3, 3' perpendicular to the flow direction of the rubber compound is narrower than the cross section of the deflector 1, also for the sake of less interference of the connectors 3, 3' with the flow of rubber compound. As depicted in FIG. 4, the cross section of the die 4 is roughly wedged shaped with a thin portion of the cross sectional area at the left and a broad portion of cross sectional area on the right. The cross section of the deflector 1 has a similar shape, i.e. a thin portion of the cross sectional area at the left side and a broad portion of the cross sectional area at the right side, providing a wedge-like shape of the deflector's cross section. The deflector's cross section is smaller than the cross section of the die 4 for allowing rubber compound to pass the deflector 1 and enter the die opening 4. In more details the deflector 1 is positioned approximately in the centre of the flow channel 2 upstream the die opening 4. Centre means that the distance of the deflector's upper and lower surfaces to the inner surface of the die opening 4 are approximately the same. The distance of the deflector's left and right surfaces to the inner surface can also be approximately the same but must not necessarily be so, as is the case in FIG. 4, depending on the shape of the deflector. It is emphasized here that the exact scale of the deflector 1 in comparison with the die opening 4 is generally of about 1 to about 2 but can vary in a range of from about 1 to about 1.5 to about 1 to about 4 for example.

Further the shape and the number of the provided connectors may vary depending e.g. on the used rubber compound, extrusion speed, or shape of the die opening, etc. The shape of the deflector must not necessarily exactly correspond to the cross-section of the die. Indeed, as illustrated in FIG. 4, the thin end portion of the cross-section of the deflector (left side in FIG. 4) is rectangular whereas the corresponding portion of the cross-section of the die opening is triangular.

In an alternative embodiment (not shown), the rectangular end portion of the deflector could be omitted. In the example of FIG. 4, the deflector is shaped to form a positive or volume obstacle in front of the area of the cross-section of the die which features the largest change of dimension. This dimension in this case is naturally the gauge or height of the generally wedge shape.

Figure 5:
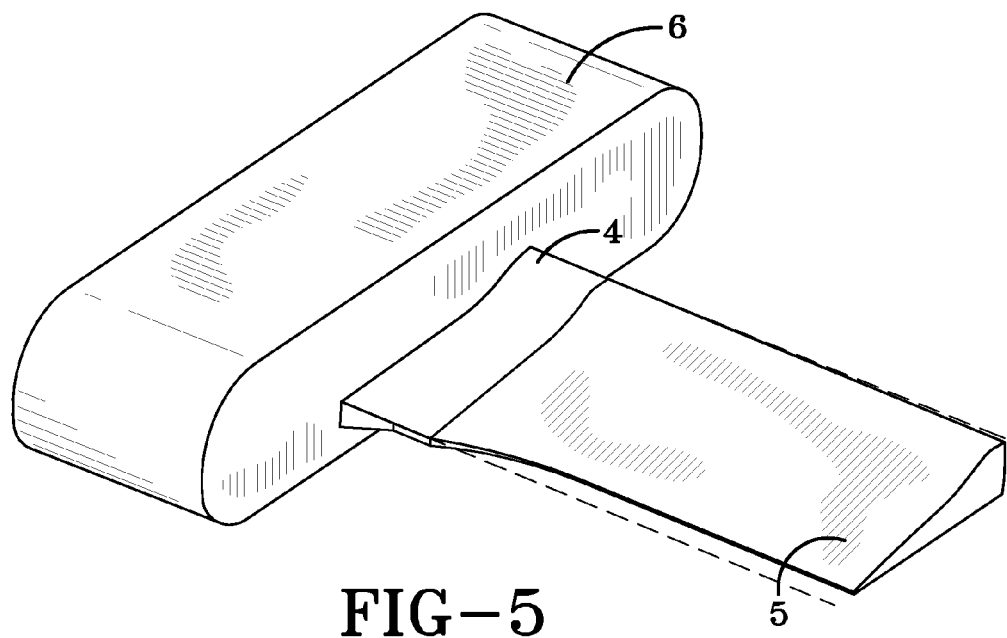
FIG. 5 is a perspective view of an apex shaped tire component being extruded by an assembly in accordance with the invention.

FIG. 5 shows a schematic representation of the rubber flow in an assembly and an attached apex 5 extruded through the die opening in accordance with FIG. 4. The deflector 1 cannot be seen in the Figure since it is inside of the flow channel. The extrusion with such a deflector 1 results in a more straight shape of the extruded apex 5. Furthermore no significant bending or twisting of extruded apex 5 can be observed. Extrusion direction is perpendicular to the cross sectional area of the die 4 as can be seen with help of the dashed lines.

Figure 6:
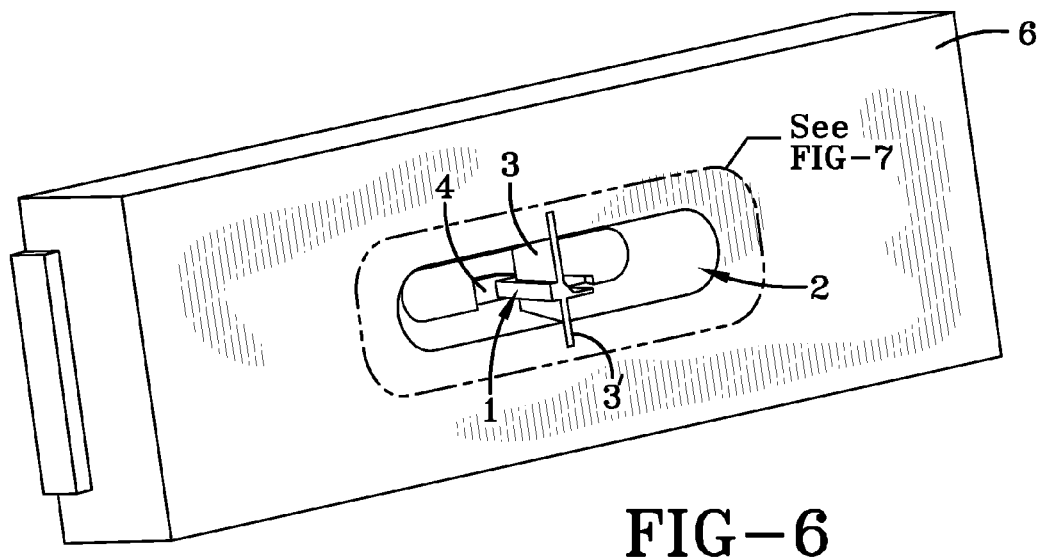
FIG. 6 is a perspective view from the back of the internal cavity of a former which contains the deflector in accordance with the invention upstream from the die opening.

In FIG. 6 a perspective overview of the assembly in accordance with the invention is shown from the backside, i.e. the internal cavity 2 of a former 6 with the deflector 1 and the connectors 3, 3'. In more detail the deflector 1 in the internal cavity 2 can be recognized in FIG. 7 which constitutes a mere magnification of the internal cavity 2 and the deflector 1 of FIG. 6.

The deflector 1 is provided in the back of the flow channel 2.

The connectors 3, 3' are designed to be inserted in the upper and lower walls of the former 6. Depending on many parameters as e.g. the form of the die opening 4 the connectors 3, 3' can also be designed to be positioned in the right and the left wall of the flow channel. The connectors 3, 3' which are shown in the Figure have a rectangular cuboid-like shape with a reduced surface in the flow direction. The connectors 3, 3' are narrower in a direction transverse to the rubber flow in comparison with the deflector 1 to minimize any influence on the flow. The connectors 3, 3' are also shorter than the deflector in a flow direction also in order to minimize any influence on the flow. They are designed to be as far away as possible from the die opening to allow the rubber compound streams on each side of the connector to unite when leaving the connector and to allow a stabilized flow before reaching the die opening.

Figure 7:
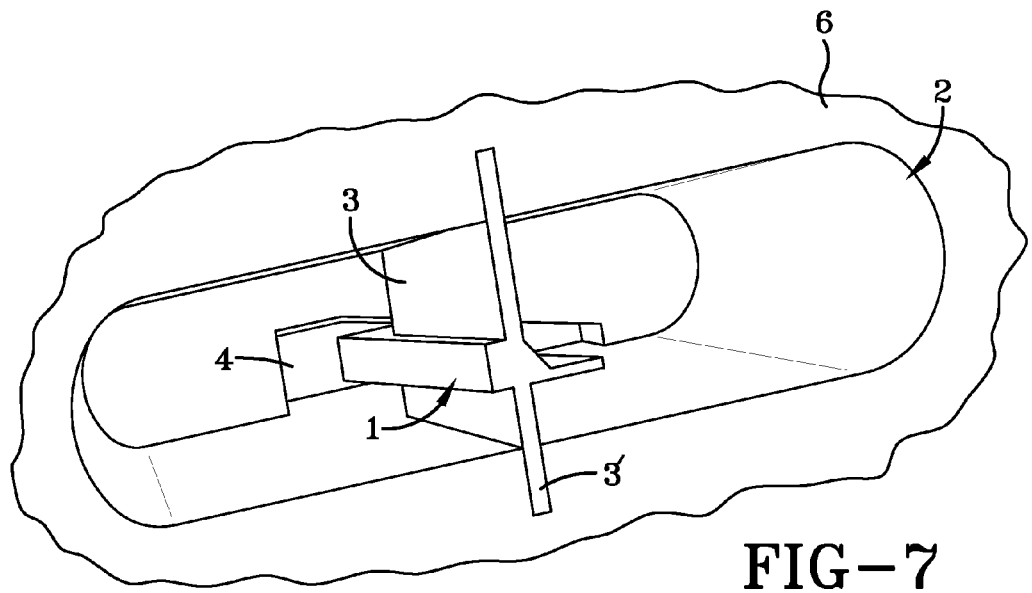
FIG. 7 is a magnification of the deflector in the perspective view of FIG. 6.

The upstream front surfaces of the connectors 3, 3' in FIGS. 6 and 7 are represented as sharp-edged but can be also chamfered or even shaped to present a profiled surface.

Figure 9A:
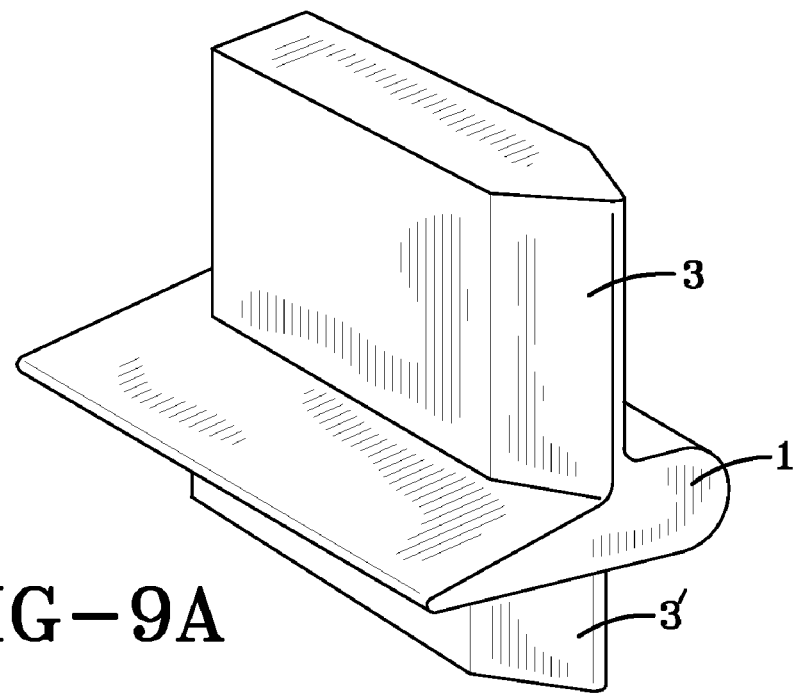
FIG. 9a is a perspective view of an alternative deflector to the deflector of FIGS. 4, 6 and 7.
Figure 9B:
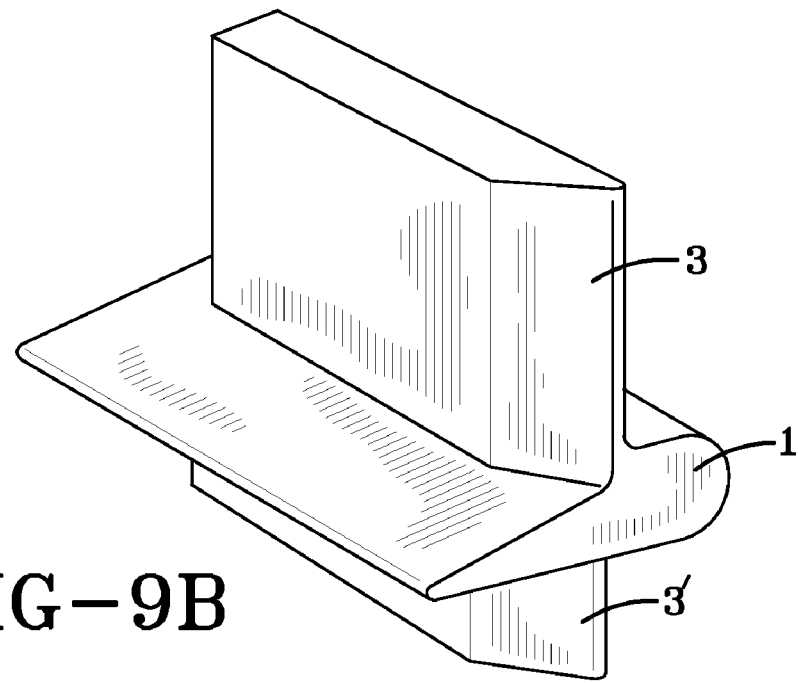
FIG. 9b is a perspective view of a yet alternative deflector to the deflector of FIGS. 4, 6 and 7.
Figure 9C:
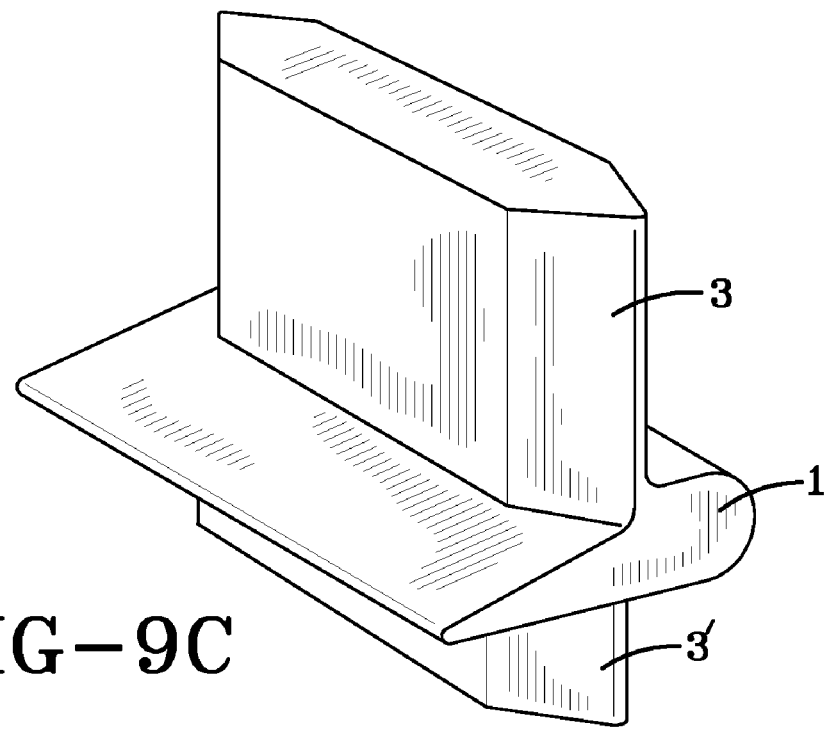
FIG. 9c is a perspective view of a yet alternative deflector to the deflector of FIGS. 4, 6 and 7.
Figure 9D:
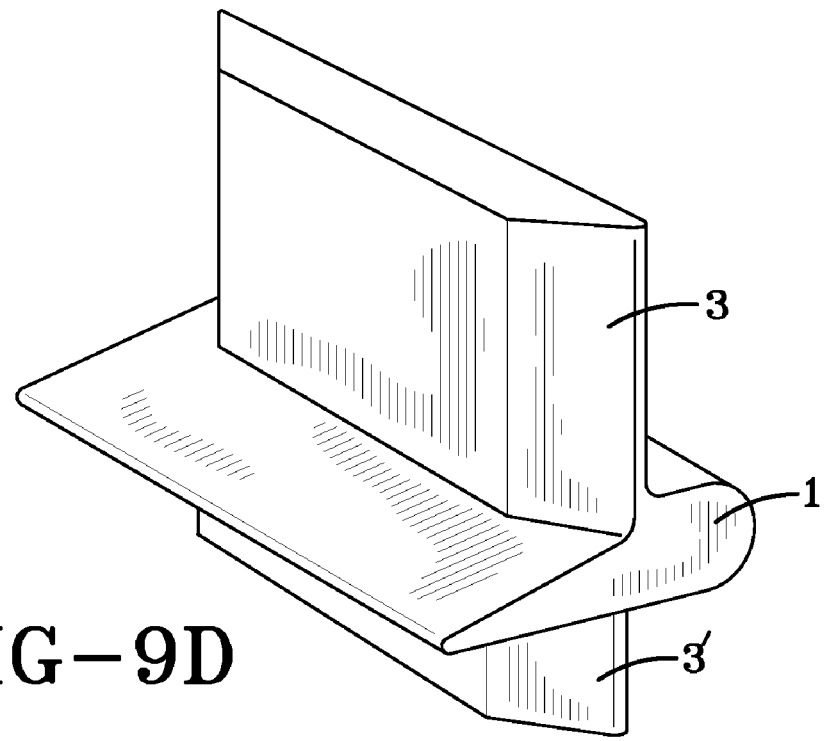
FIG. 9d is a perspective view of a yet alternative deflector to the deflector of FIGS. 4, 6 and 7.
Figure 9E:
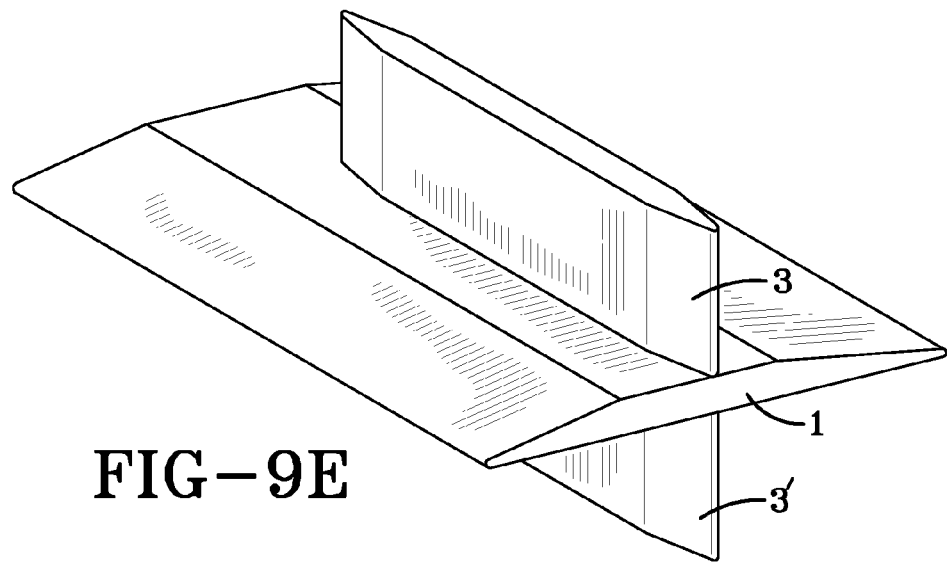
FIG. 9e is a perspective view of a yet alternative deflector to the deflector of FIGS. 4, 6 and 7.
Figure 9F:
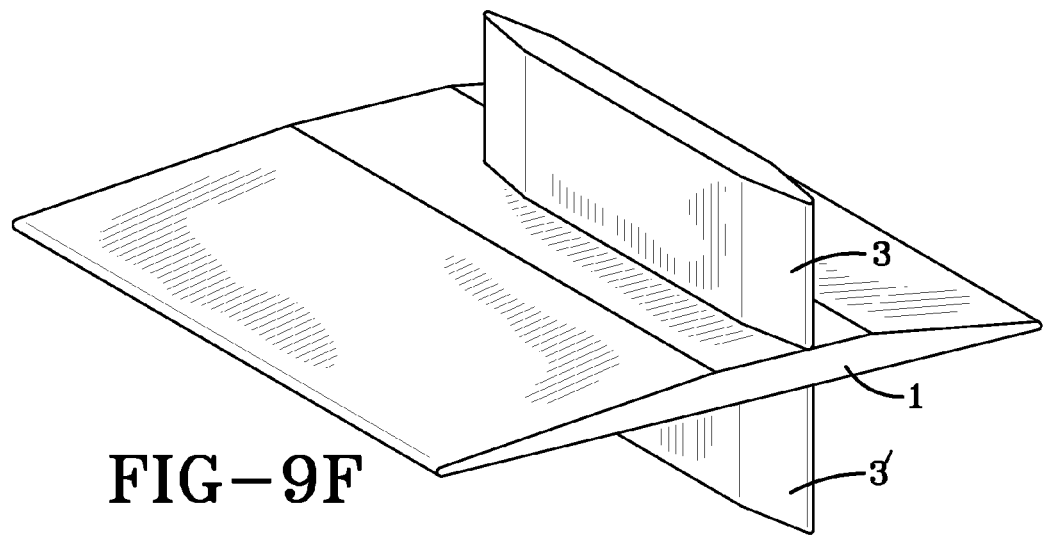
FIG. 9f is a perspective view of a yet alternative deflector to the deflector of FIGS. 4, 6 and 7.
Figure 9G:
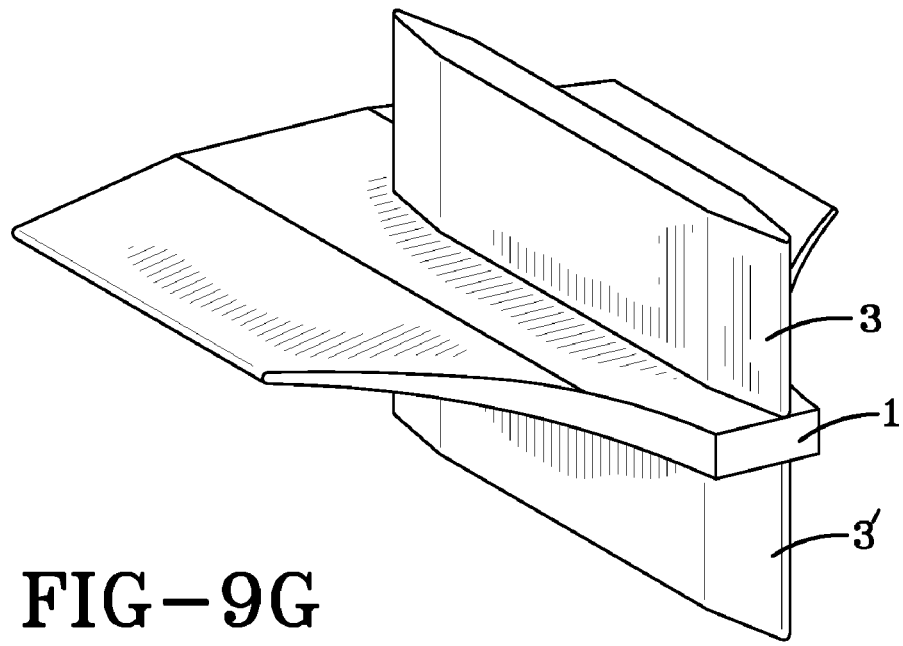
FIG. 9g is a perspective view of a yet alternative deflector to the deflector of FIGS. 4, 6 and 7.
Figure 9H:
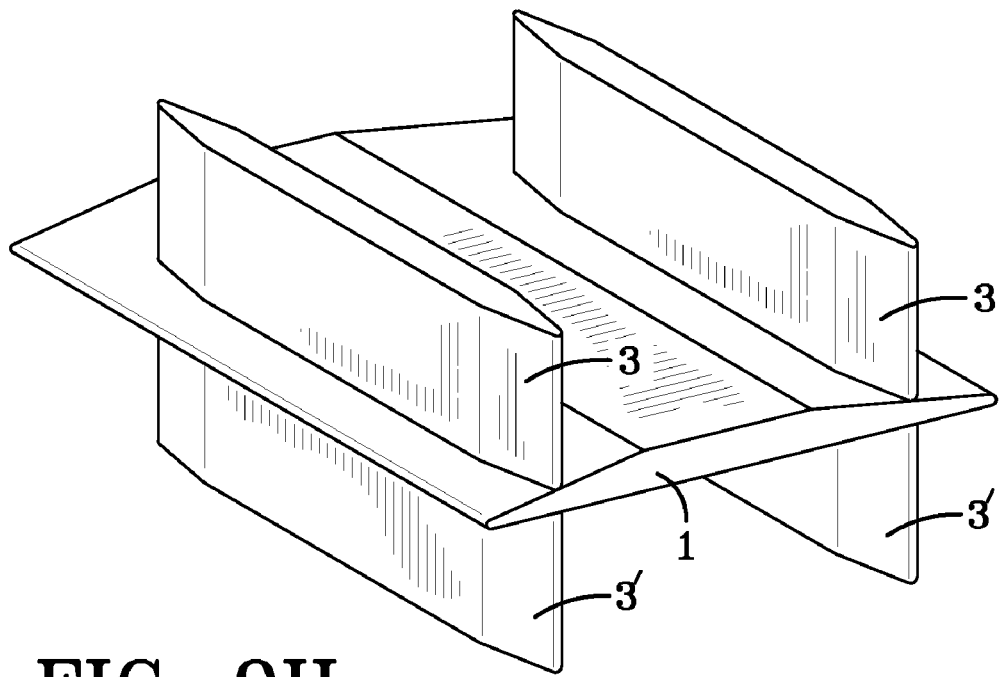
FIG. 9h is a perspective view of a yet alternative deflector to the deflector of FIGS. 4, 6 and 7.

FIGS. 9a-9h illustrate alternative embodiments of the deflector where the body of the deflector and the connectors are differently shaped depending on many parameters like the flow speed, the viscosity of the rubber during extrusion, the shape of the die opening and the distance from the die opening. The compound flow direction goes from the front of the drawing to the back. In FIG. 9a the connectors are chamfered to present a profiled arrow shaped front surface to the rubber flow. The downstream surfaces of the connector are there not profiled. In FIG. 9c, the downstream surfaces are profiled similarly to the upstream surfaces. In FIGS. 9b and 9d, the connectors are made narrower where the upstream faces are beveled and the downstream faces in FIG. 9d are also beveled. In FIG. 9e, the deflector is symmetrical and wedge shaped. The connectors have beveled upstream and downstream faces. The deflector of FIG. 9e is similar to FIG. 9e but asymmetrical. The deflector of FIG. 9g corresponds essentially to FIG. 9e with the difference that the active length of the deflector varies across the elongated dimension. This embodiment is illustrative of a situation where additional flexibility is needed to tune the slowdown/braking effect on the rubber flow in front of the die opening. In FIG. 9h the deflector is asymmetrical like in FIG. 9e but with two pairs of connectors 3-3'. Each pair is positioned on a side part of the wedge shaped deflector.

Figure 8:
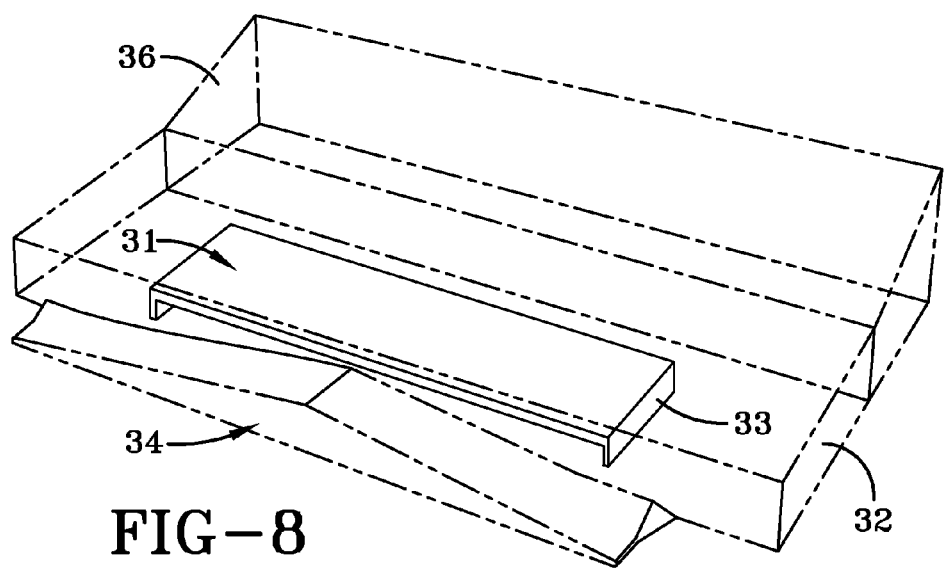
FIG. 8 is a perspective exploded view of an assembly for the extrusion of a thick wedge shaped tire component providing a deflector inside of the flow channel upstream the die opening.

In FIG. 8 a deflector 31 is shown in the cavity of a former 32 upstream a die opening 34. Connectors 33, one at each side of the deflector 31, connect the deflector 31 to the bottom wall of the former 32. The die opening 34 and the deflector 31 are symmetrical. Many other positions and numbers of connectors 33 can be provided by the man skilled in the art, depending on the specific tire component's material, extrusion speed, shape etc. The cross section of deflector 31 has a rectangular shape in the flow direction, but is designed smaller than the cross section of the die 34, and is narrower than the die width 34, thus being only positioned in front of broad portions of the die cross section, such that it can slow down the flow of rubber compound in front of broad portions of the cross-sectional area of the downstream die 34.

The rectangular shape of the deflector in FIG. 8 is a simplified shape which is particularly adapted for substantially symmetrical cross-sectional shapes to be extruded. This type of deflector is advantageously centered along the main axis of the cross-section of the die and the two ends portions of the cross-section of the die with the minimum dimensions have to be free of deflector in front of them. In the example of FIG. 8, the thickness variation along the elongated cross-section of the die is of about 1 to 10 and the end portions free of deflector correspond to about ¹⁄₁₀ of the total length of the die opening. The simplified shape of the deflector causes then a general braking effect of the rubber flow which causes a slowdown of the rubber flow in front of the large portion of the die opening thereby compensating the natural slowdown of the flow at the end portions with a minimal thickness. The advantage of this simplified shape is that it can be used for different similar wedged shaped die openings.

The typical width of a thick wedge is about 100-120 mm. Nevertheless it can have other widths depending on the application purpose of the thick tire wedge.

The invention has been described with reference to a best mode. Obviously, modifications and alterations will become apparent to others upon a reading and understanding this specification. It is intended to include all such modifications and alterations in so far as they come within the scope of the appended claims or the equivalents thereof.

What is claimed is:

1. A method for extruding a rubber compound, the method comprising the steps of:
providing an extruder, a die with a die opening the cross-section of which comprises a first area with a dimension which is higher than in a remaining area of the cross-section, and a flow channel connecting the extruder with the die;
generating a flow of rubber compound with the extruder and extruding therewith the rubber compound through the flow channel and the die opening;
providing a deflector shaped as a positive obstacle in the flow channel upstream the die opening, wherein the deflector is positioned in front of the first area of the cross-section of the die opening and wherein the dimension of the cross-section of the deflector is smaller than a corresponding dimension of the first area of the cross-section of the die opening so that the flow of rubber compound is slowed down in front of the first area of the cross-section of the die opening and wherein the cross-sectional shape of the deflector is similar at a reduced size to the shape of the first area of the die opening or mimics at a reduced size the shape of the first area of the die opening and wherein the deflector is positioned by at least one or more connectors for attaching the deflector to the walls upstream and in the center of the first area of the die opening such that the distance of an upper surface and a lower surface of the deflector are the same relative to inner surfaces of the first area of the die opening and wherein the at least one or more connectors are spaced away from the die opening to allow the rubber compound on each side of the connectors to unite before entering the die opening; and
stabilizing the rubber flow before reaching the die opening by allowing the rubber compound flow on each side of the connector to unite when leaving the connector.

2. The method of claim 1 wherein an area of the cross-section of the die opening with a minimum dimension is free of the deflector upstream in the flow channel.

* * * * *